(12) United States Patent
Dancer

(10) Patent No.: US 11,035,506 B2
(45) Date of Patent: Jun. 15, 2021

(54) COUPLING APPARATUS FOR JOINING POLY-PIPE

(71) Applicant: Johnny Sam Dancer, Dumas, AR (US)

(72) Inventor: Johnny Sam Dancer, Dumas, AR (US)

( * ) Notice: Subject to any disclaimer, the term of this patent is extended or adjusted under 35 U.S.C. 154(b) by 359 days.

(21) Appl. No.: 16/279,940

(22) Filed: Feb. 19, 2019

(65) Prior Publication Data

US 2019/0257451 A1    Aug. 22, 2019

Related U.S. Application Data

(60) Provisional application No. 62/633,512, filed on Feb. 21, 2018.

(51) Int. Cl.
  *F16L 21/00* (2006.01)
  *F16L 55/17* (2006.01)

(52) U.S. Cl.
  CPC ............ *F16L 21/002* (2013.01); *F16L 55/17* (2013.01)

(58) Field of Classification Search
  CPC ............................... F16L 21/002; F16L 55/17
  See application file for complete search history.

(56) References Cited

U.S. PATENT DOCUMENTS

| | | | |
|---|---|---|---|
| 145,731 A | 12/1873 | Edson | |
| 3,269,754 A | 8/1966 | Bertling | |
| 3,394,951 A | 7/1968 | Crivello | |
| 3,612,580 A * | 10/1971 | Jones | F16L 11/085 285/294.2 |
| 3,990,729 A | 11/1976 | Szentmihaly | |
| 4,257,630 A * | 3/1981 | Bartell | B29C 66/72141 285/21.2 |
| 4,293,147 A | 10/1981 | Metcalfe | |
| 4,564,222 A | 1/1986 | Loker | |
| 4,584,217 A * | 4/1986 | McClintock | C09J 5/10 428/41.8 |
| 5,869,159 A * | 2/1999 | Padilla | E04F 13/0733 428/40.1 |
| 6,022,054 A * | 2/2000 | Hemphill | B29C 65/5042 285/398 |
| 7,658,814 B2 | 2/2010 | Horvitz | |
| 9,267,637 B2 | 2/2016 | Pionetti | |
| 9,388,927 B2 | 7/2016 | Shmelev | |
| 9,574,690 B2 | 2/2017 | Clevelario | |
| 10,451,208 B1 * | 10/2019 | Bailey | F16L 55/1686 |
| 2004/0145179 A1 | 7/2004 | Fawley | |
| 2004/0247260 A1 * | 12/2004 | Staudt | F16L 13/103 385/95 |

(Continued)

*Primary Examiner* — James M Hewitt, II
(74) *Attorney, Agent, or Firm* — Stephen D. Carver

(57) ABSTRACT

A system for repairing irrigation poly-pipe comprises cooperating, user-deployable, inner stabilizer and an outer sealing band that are adhesively attached to prepared ends of the poly pipe to be joined. The stabilizer and sealing band are lightweight, and adapted to be disposed in flat, storage or shipping configurations prior to use. Each end of two flat poly-pipe end segments can be drawn over the stabilizer, abutting tabs at the stabilizer center. Adhesive on stabilizer segments may be exposed by removing tear strips to affix to the pipe ends. An externally applied sealing band has ends that can be manually grasped, for deployment around the pipe ends drawn over the stabilizer, coaxially surrounding the seam formed by the tabs at the juncture of the two pipe ends to seal it and waterproof it.

4 Claims, 7 Drawing Sheets

(56) References Cited

U.S. PATENT DOCUMENTS

| | | |
|---|---|---|
| 2009/0085346 A1 | 4/2009 | Cloos |
| 2013/0315672 A1* | 11/2013 | Pajak ..................... F16L 57/06 |
| | | 405/157 |
| 2014/0265311 A1 | 9/2014 | Taylor |
| 2016/0238178 A1* | 8/2016 | Urbanski ............ F16L 55/1654 |

* cited by examiner

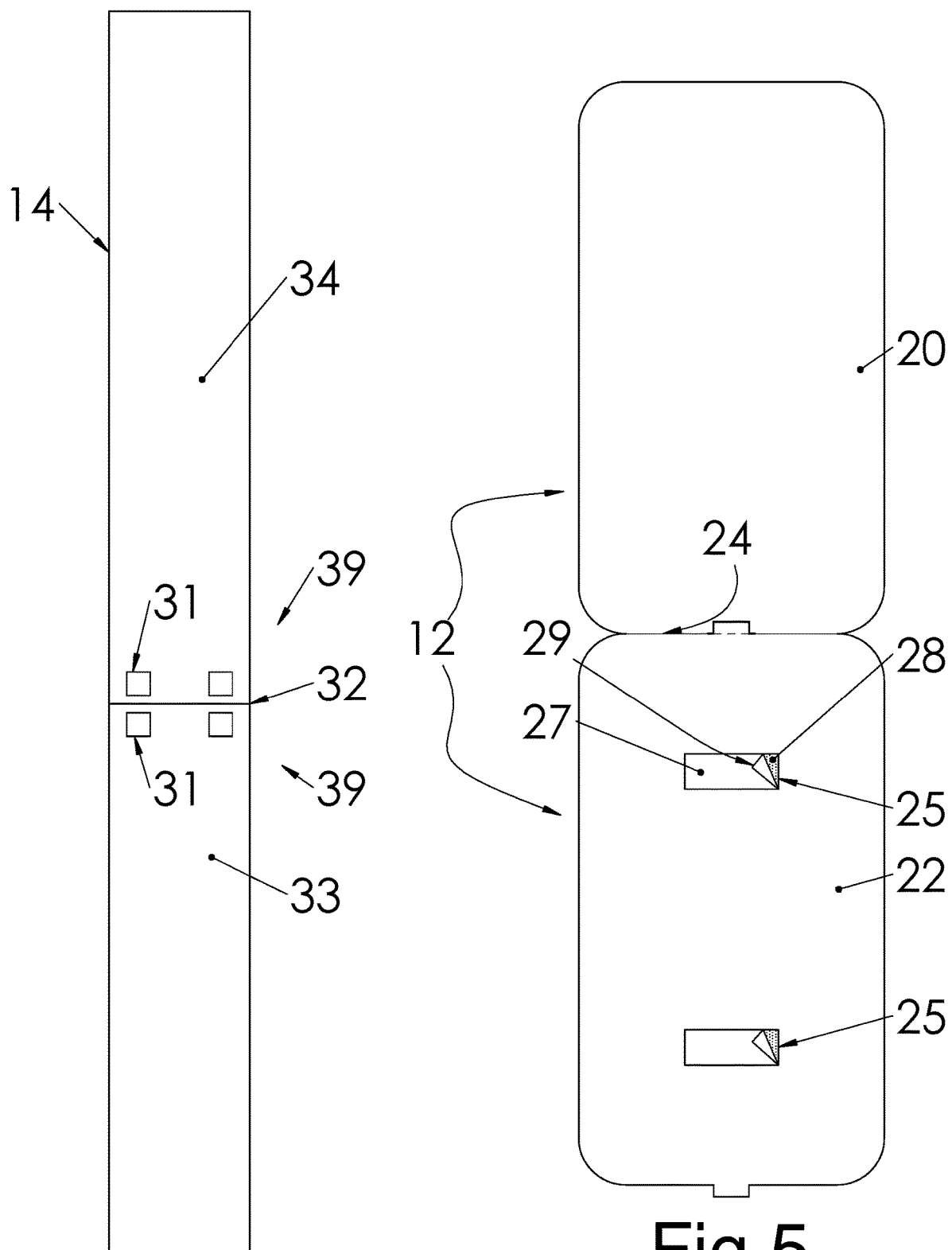

COUPLING APPARATUS FOR JOINING POLY-PIPE

CROSS-REFERENCE TO RELATED APPLICATION

This application is based upon, and claims priority from, U.S. Provisional Patent application entitled "Method and Apparatus for Joining Poly-Pipe," Ser. No. 62/633,512, Filed Feb. 21, 2018, by inventor Johnny Sam Dancer.

BACKGROUND OF THE INVENTION

I. Field of the Invention

The present invention relates generally to couplers or unions adapted to couple together or splice adjacent segments of elongated irrigation pipe. More particularly, the present invention relates to splicer apparatus for joining plastic pipe ends with non-rigid parts that ship in a flat configuration but deploy after installation in a cylindrical configuration in response to water pressure. Known prior is classified, among other places, in USPC Class 285, Subclass 109.

II. Description of the Prior Art

The widespread use of plastic irrigation piping is well recognized in the farming arts. Various forms of plastic pipe, both rigid and flexible, are commonly employed for field irrigation of substantially level ground. Rigid PVC pipe or polyethylene pipe are common. Thin-walled, polyethylene piping, commonly known as "poly-pipe," has become quite popular. This type of pipe exhibits numerous advantages. For example, poly-pipe reduces evaporation or percolation losses. Installation is simplified, resulting in cost and time savings to the farmer. Productivity is enhanced by allowing the farmer to irrigate when and where it is desired. Poly-pipe sections are characterized by less internal friction, allowing water to travel farther without pressure pumps along the way. For typical level grade farming, selected regions can be irrigated when desired with variously oriented sections of poly-pipe tubing substantially traversing the target area. Poly-pipe is so flexible that 90-degree turns and bends around obstacles are possible to minimize cutting and the gluing of fixtures during installation. Further, typical installation equipment is affordable. Thus irrigation costs can be minimized where poly-pipe is used.

Despite numerous advantages involving cost, flexibility, and reliability, poly-pipe has recognized disadvantages. Over time the pipe can suffer from ultra-violet degradation. Improper venting, a frequent cause of problems, can restrict flow and increase pressures if air builds up in the pipe. Over-pressure situations can burst sections of the pipe. Furthermore, poly-pipe is somewhat fragile, and it can be ruptured by inadvertent contact with sharp stones, machinery, or even animals, especially during high pressure operation.

Thus poly-pipe repairs are frequently needed. Typically, rigid, cylindrical sleeves with inner and/or outer companion sleeves or bands are used to create repair junctions or unions. Known sleeves are relatively cumbersome and heavy. Known splicing sleeves can be twelve to fifteen inches in length, and they can weigh around seven to ten pounds. Usually they are transported by truck within the field, and they must be serially deployed with significant human labor. When the season is over, such relatively expensive unions must be collected, loaded, transported, and then unloaded, stored, and cleaned for reuse.

Rigid or semi-rigid, tubular hose couplings are well known in the art. For example, U.S. Pat. No. 3,990,729 issued Nov. 9, 1976, entitled "End fitting for Hoses," discloses a rigid end fitting for a tubular hose comprising a rigid, tubular insert, a ferrule to surround at least a portion of the insert, an annular seal of resilient material, and spring means that maintain sufficient sealing contact with internal parts until pressure builds up in the hose.

Another pipe joint with rigid or solid coaxial parts is seen in U.S. Pat. No. 4,293,147 issued Oct. 6, 1981, and entitled "Method and apparatus for securing a pipe to a Fitting." This reference discloses a rigid internal insert that is concentrically connected to the pipe. The insert tightly fits into an end of the pipe, and a sleeve is then forced over the pipe end to tightly, coaxially clamp the insert and the sleeve.

Another union device with solid parts is seen in U.S. Pat. No. 4,564,222 issued Jan. 14, 1986 and entitled "Separable coupling for thin-walled flexible Hose." The latter reference is directed to the joining of thin-walled tubing. An inner sleeve and an intermediate member are secured by an outer sleeve with the tubing therebetween.

U.S. Pat. No. 7,658,814 issued Feb. 9, 2010 discloses an irrigation pipe splice formed from two sub-assemblies, each assembly including a rigid, tubular sleeve mated to a portion of a pipe section. Each sleeve has an inner wall and an outer wall connected by a rim, the outer wall surrounding at least a portion of the inner wall and forming a gap therewith. In the pipe splice, the inner and outer walls sandwich a pipe wall within the gap.

Similarly, rigid coupling parts are employed by the system of U.S. Pat. No. 9,267,637 issued Feb. 23, 2016 and entitled "Coaxial pipe assembly including a thermally insulating Sleeve." The latter disclosure involves the assembly of two coaxial pipe elements, each with an inner pipe and an outer pipe defining an annular space. These are filled with an insulating material and assembled end to end by welding. A sleeve with a hollow tubular wall made of rigid or semi-rigid material, preferably of plastic or composite material, surrounds the welded junction zone between the two coaxial pipe elements.

U.S. Pat. No. 9,388,927, Jul. 12, 2016 entitled "Polymer pipe connection Assembly" uses rigid components for joining plastic pipe sections. The disclosed joint assembly includes a fitting positioned inside polymer pipe, a cylindrical coupling which covers the pipe and fitting, and a sleeve capable of changing geometrical dimensions and shape under pressure which is press-fitted to the assembly. The change of the dimensions of the sleeve can be performed both by selecting different types of sleeve material or by its construction.

U.S. Pat. No. 9,574,690 issued Feb. 21, 2017 uses a rigid sleeve and a rigid end fitting assembly in a method for assembling a flexible pipe. The sleeve includes substantially cylindrical portion having an inner diameter substantially equal to an outside diameter of the pipe, and a flange portion extending radially outwards for connection to another pipe portion.

Publication No. U S 2004/0145179 published Jul. 29, 2004 and entitled "System for joining sections of composite reinforced line Pipe," joins pipe sections by aligning first and second pipe segments, each having a reinforcement wrapped circumferentially about it. A joint tape is circumferentially wrapped about the junction. A resin reinforcement tape is circumferentially wrapped about the prior joint tape, followed by curing the joint tape and resin reinforcement tape.

Publication No. US2009/0085346 published Apr. 2, 2009 and entitled "Connecting structure for a Pipe" discloses a junction with an inner lining and a rigid, fiber-reinforcement surrounding the lining. A coupling piece with an outer wedge-shaped surface receives a coaxially surrounding sleeve. A fiber-reinforced layer disposed between the coupling piece and the sleeve and is clamped there-between. The outer surface of the coupling piece has portions with different wedge angles adapted to mate within the sleeve which has complimentary, angled wedged portions.

Publication No. US2014/0265311 issued Sep. 18, 2014 and entitled "Inner Coupler For Joining Non-Metallic Pipe Method And System" discloses a process for joining thin walled non-metallic pipe using a rigid, tubular inner coupler. The inner coupler is inserted into the pipe and bonded to the pipe. The inner coupler has a shoulder for clamping inner coupled pipe joints together. The pipe joint may be reinforced using a continuous fiber tape. The bonding may include electrofusion, adhesives, heating, and damping, of the inner coupler to the pipe.

Clearly a light weight, disposable poly-pipe repair system would be advantageous, particularly if it can be repaired during wet or moist conditions. In addition, where components of such a pipe repair system can be shipped or stored in a flat configuration, the volume is minimized and shipping costs and storage costs are reduced.

SUMMARY OF THE INVENTION

This invention comprises a splicer for repairing poly-pipe, or other light weight, plastic irrigation pipe, by joining or coupling two adjacent sanctions. The splicer can be packaged and sold a s a flat kit for deployment in the field without special tools or equipment. It comprises cooperating, user-deployable, inner and outer pieces that are adhesively attached to ends of poly pipe that are to be joined.

The inner piece comprises a stabilizer and the external piece comprises a sealing band, both of which are flexible, lightweight, and adapted to be stored in a flat condition during storage and shipment prior to use. With two ends of flatly disposed, plastic irrigation pipe laid out with their ends aligned, the system is quickly adhesively deployed, and the pipe will conduct water without leaking.

The inner piece is a stabilizer, that, in the best mode is rectangular in shape and provided with adhesive tape sections. The flat stabilizer transforms to a generally cylindrical shape once installed, after the repaired pipe is pressurized. The sticky adhesive is exposed by removing the tear strips. When the tear strips are removed, and the flat, stabilizer end is partially inserted into the end of a first, flat irrigation pipe end to be joined with another, a portion, preferably half, of the exposed tape bonds to the interior of the first pipe end. The latter pipe end engages the stabilizer and abuts a tab that provides a boundary between the pipe ends to be joined. Then, with the unattached part of the adhesive backed tape exposed, the uncoupled end of the stabilizer can slide into the end of the other flat pipe end, where it is adhesively secured within that pipe section. The latter pipe end abuts the tab as well. Both halves of the stabilizer are adhesively coupled to pipe ends to be joined. By pressing firmly downwardly on the pipe and its joined ends, the stabilizer inside will make adhesive contact.

Upon installation the stabilizer does not form a complete circle inside the flexible pipe and is not intended to hold water. It will transform from the flat shipping configuration, becoming circular or tubular in response to water pressure. The inner stabilizer braces the flexible and very uncontrollable poly-pipe in the field. Further, the stabilizer makes it possible to install the sealing band via its tape in a quick and workable manner.

The sealing band comprises an elongated, flat rectangular band comprising a pair of ends that are disposed adjacent one another when the band is undeployed in a flat configuration. The normally flat, uninstalled sealing band can transform to a somewhat circular or cylindrical configuration once the repaired pipe is pressurized. Adjoining ends can be grasped, and the pipe segments joined by the stabilizer halves can be circumscribed and covered by the sealing band that is centered over the tabs. Initially positioned underneath the joined poly-pipe, the sealing band ends can be manually grasped for deployment and wrapped around the joined pipe ends, coaxially surrounding the seam formed by the tabs at the juncture of the two pipe ends to seal it and waterproof it. Pressure against the inner stabilizer assists the adhesive bonding process.

Thus a basic object is to provide a quick and inexpensive union for joining and repairing sections of poly-pipe.

A related object is to provide a splice system for joining ends of poly pipe.

A broad object is to streamline the installation and repair of poly-pipe irrigation structures.

Another important object is to provide light weight, disposable poly-pipe repair system comprising flat components that can be assembled while the pipe ends to be joined are flat, and which, after assembly, assume the normal generally cylindrical shape in response to water pressure.

A related object is to provide a repair union for poly-pipe employing adhesives to complete an easier and faster, cost efficient water proof joint.

An important related object of the invention is to employ a non-rigid, inner sleeve or "stabilizer" for joining poly-pipe that can be shipped and packaged in a flat configuration. It is a feature of the invention that critical sleeve portions of the invention can be stored in a flexible, minimal-volume, flat configuration, which, once installed and subjected to pressure, transforms to the usual cylindrical configuration.

Another important object is to provide a poly-pipe junction of the character described utilizing an internal, flexible piece that is not a bladder or watertight cylinder or valve. It is a feature of the invention that during installation it does not form a complete circle inside or around the poly-pipe, and it is not intended to hold water.

Yet another simple object is to avoid the use of conventional, rigid poly-pipe couplings or unions, thereby minimizing installation time and avoiding the necessity to collect and transport and store unions during the off season.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 4 is an enlarged top plan view of the preferred, unattached sealing band;

FIG. 5 is an enlarged top plan view of the unattached and unfolded internal stabilizer;

DETAILED DESCRIPTION OF THE PREFERRED EMBODIMENTS

Figure 1:
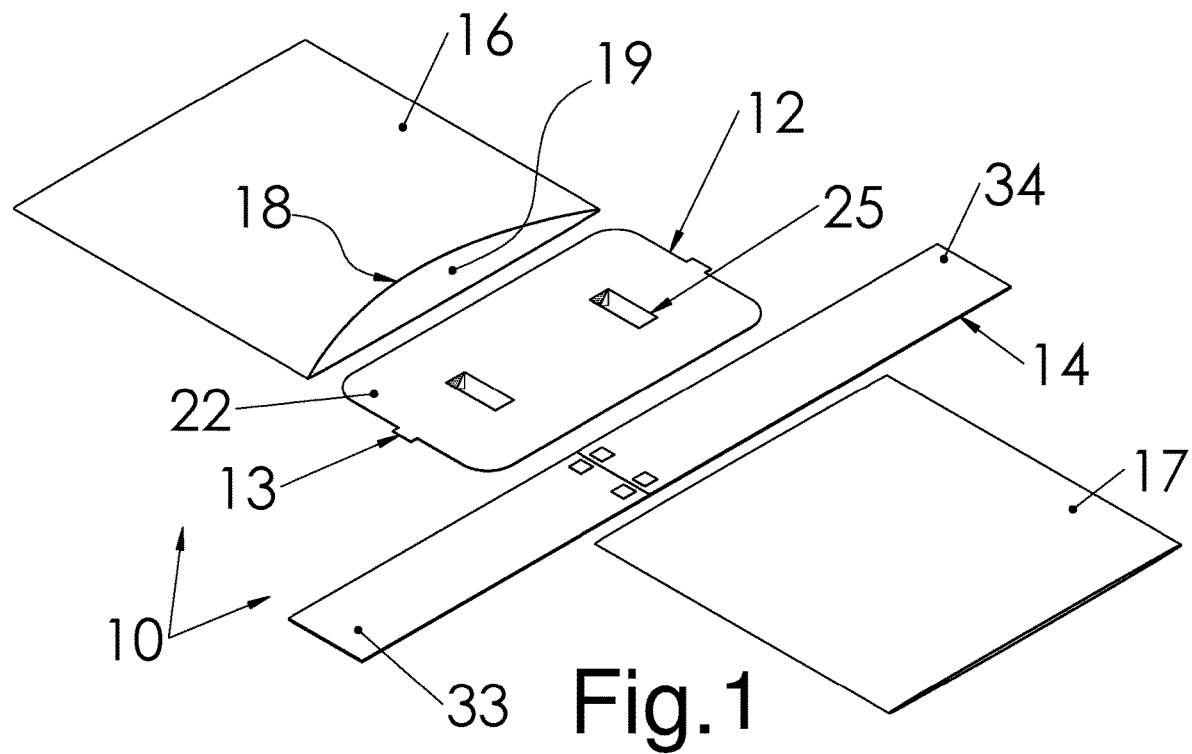
FIG. 1 is a fragmentary, exploded isometric view of the invention flatly disposed adjacent ends of poly-pipe to be joined.
Figure 2:
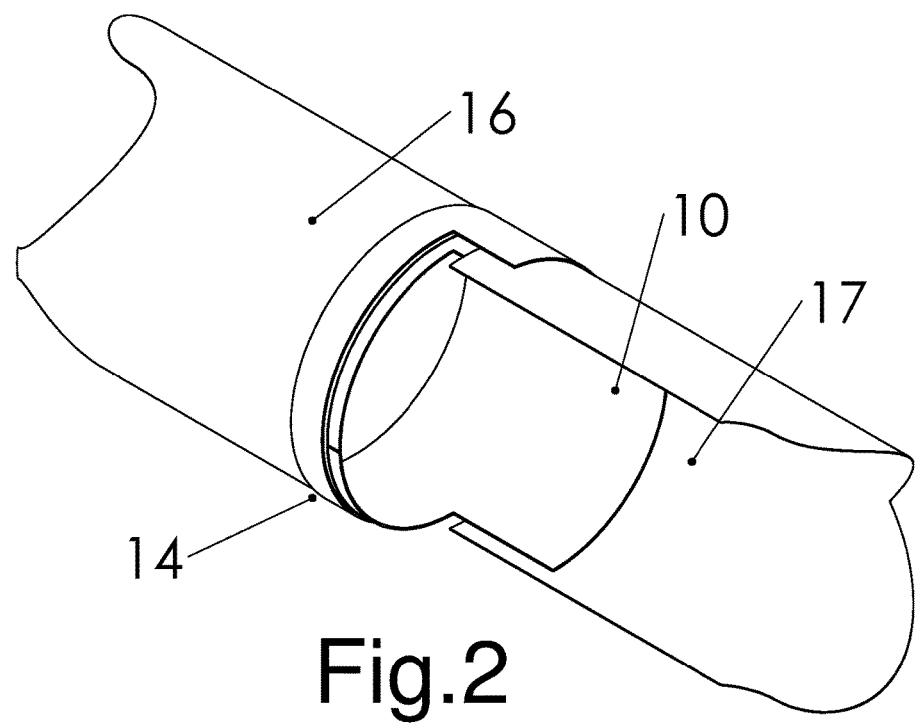
FIG. 2 is an enlarged, fragmentary isometric view of poly-pipe sections that have been joined after complete deployment of the instant system.

Turning now to the drawings, FIG. 1 shows the pipe-joining splicer 10 with its preferably flat, undeployed parts laid out for installation. As explained hereinafter, the various system parts are stowed or shipped while in a flat configuration, thus assuming a minimal volume. When unwrapped and readied for use, the flat parts will be laid out adjacent ends of poly-pipe to be joined that are also flat, i.e., unpressured by water, and preferably trimmed. Once deployed, and water pressure is applied to the repaired, spliced poly-pipe, pressure will "inflate" the apparatus, causing the pipe ends to assume the generally cylindrical configuration of FIG. 2.

Preferably splicer 10 comprises a separate flat, two piece stabilizer 12 (FIGS. 1, 5) with tabs 13 at its ends, which is affixed internally of the spliced pipe ends. A companion flat, generally rectangular sealing band 14 is applied externally. Until deployed and pressurized, both of these lightweight, disposable parts 12 and 14 are flat, and they may be packaged in flat envelopes or containers.

As illustrated, a first poly pipe pipe end 16 is to be joined with an adjacent pipe end segment 17, both of which my be neatly trimmer with a scissors, knife or the like. The outer end 18 of pipe segment 16 can be manipulated and lifted upwardly by hand to expose the interior 19 of the pipe segment 16 (FIG. 1). The opposite pipe segment 17 can be similarly opened and hand-manipulated to expose its interior and to permit an end of the stabilizer 12 to enter.

Figure 3:
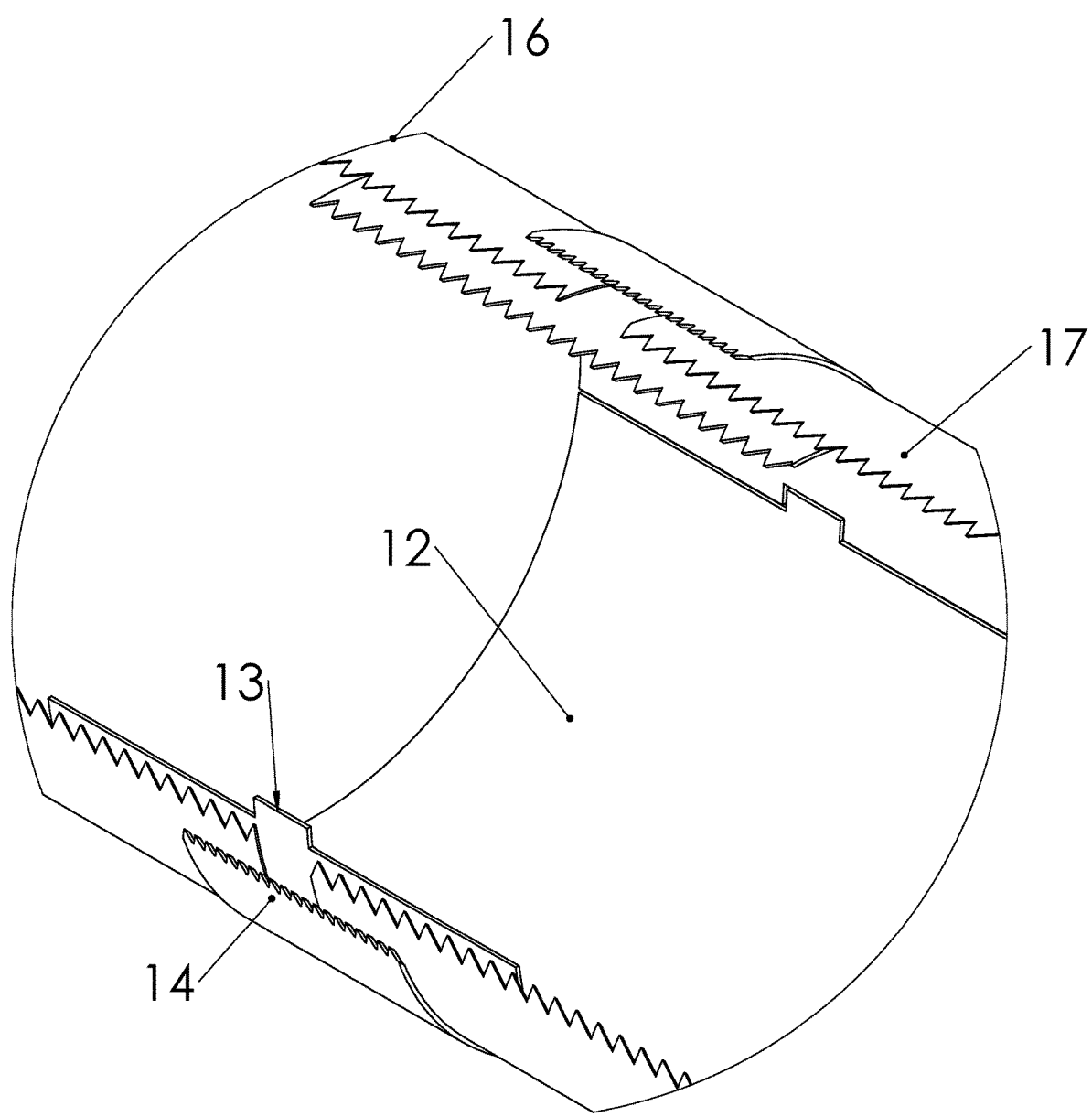
FIG. 3 is an enlarged fragmentary sectional view of the junction area, with portions broken away for brevity.
Figure 6:
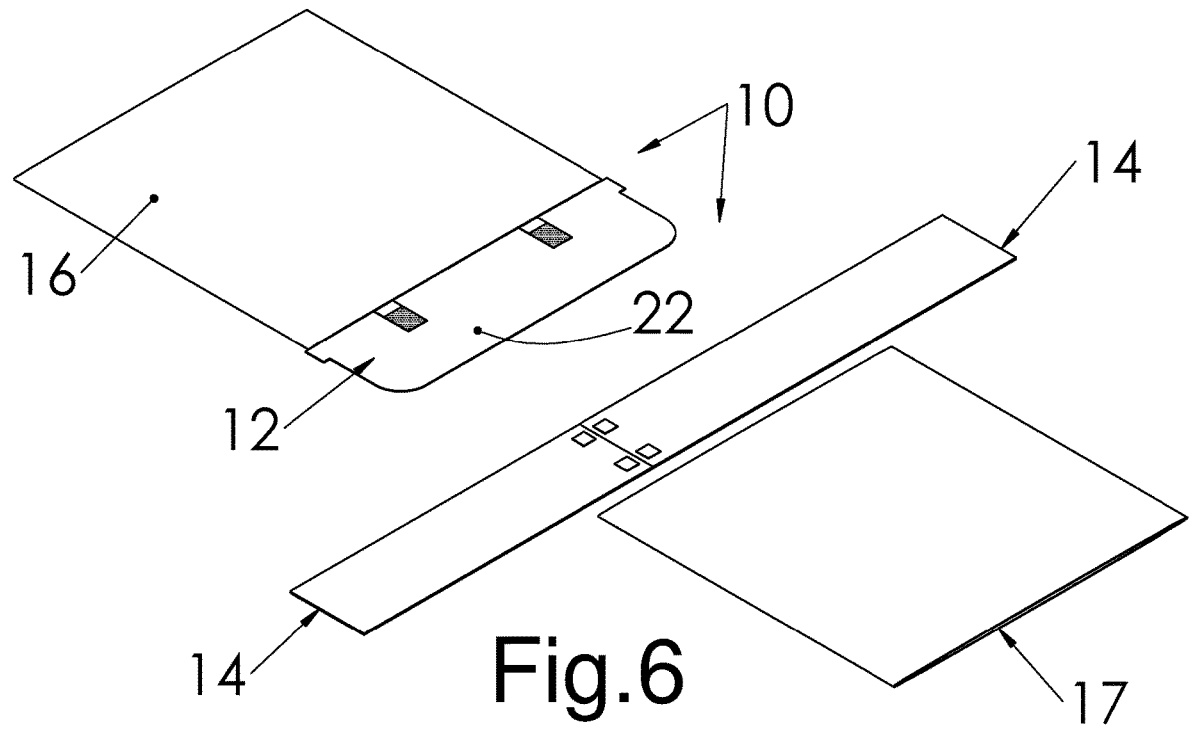
FIG. 6 is a diagrammatic view showing an end of the folded stabilizer connected to and within a first pipe end.
Figure 7:
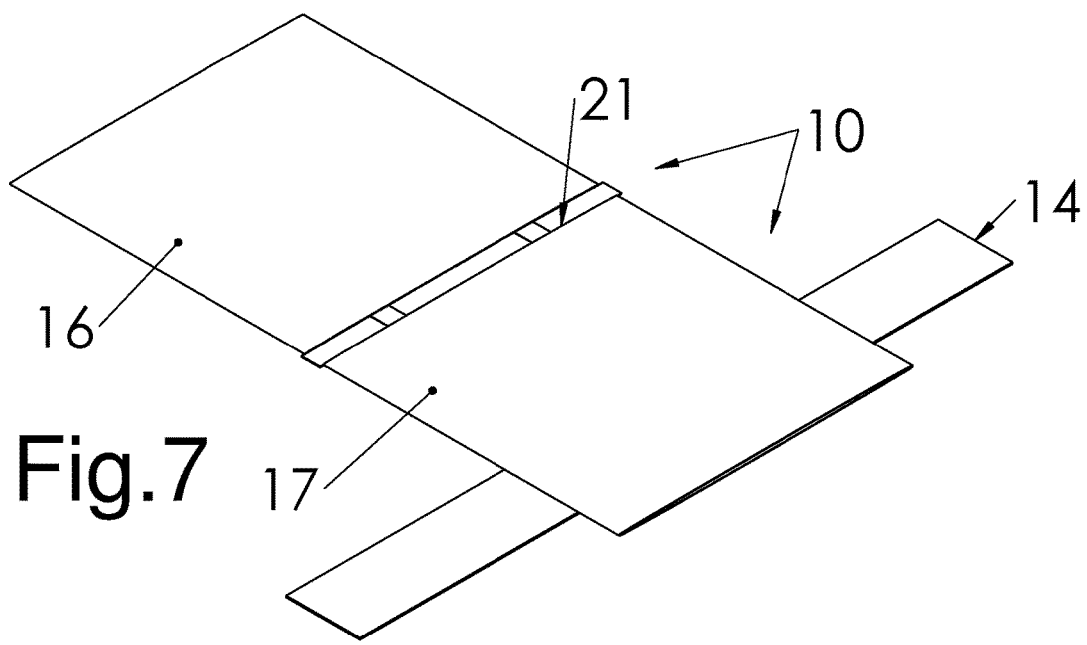
FIG. 7 is a diagrammatic view showing the second step completed, with the stabilizer connected additionally to and within an adjacent second pipe end.

In FIG. 5 it is seen that the flat, undeployed stabilizer 12 comprises a pair of integral, rectangular halves 20, 22 that are folded about the joined center line 24 to form the flat configuration of FIG. 1. The outer stabilizer surface 22 has at least a pair of spaced-apart adhesive attachment portions 25 normally overlaid by exterior tear strips 27 that can be manually removed to expose adhesive surfaces 28. Corners 29 of the tear strips 27 can be manually pulled away to expose the adhesive surfaces 28. With the stabilizer 12 positioned as in FIG. 1, the tear strips 27 can be removed, and the stabilizer 12 can be half inserted into the interior 19 of pipe segment 16, until the pipe end abuts tab 13. At this time stabilizer half 20 (i.e., FIG. 5) will be touching the ground. Then by pressing downwardly against the outer pipe surfaces, a semi-permanent connection to locate the stabilizer 12 half way within pipe segment 16 (i.e., FIG. 6) results. Then the exposed end of the stabilizer half 22 is similarly inserted within the opened end of pipe segment 17, yielding the partially assemble configuration of FIG. 7. At this point the sealing band 14 has not been attached. The exposed adhesive surfaces 28 (FIG. 3) will secure the stabilizer 12 within ends of pipe segments 16 and 17.

The sealing band 14 circumscribes the poly-pipe junction. Preferably the sealing band is made from black polyethylene film tape that is adhesively backed with paper. It is flexible, durable, and waterproof. The tape bonds to a variety of surfaces both underwater and out of water. The tape forming the sealing band has an excellent wide temperature range and forms a permanent watertight bond when applied as described.

Figure 8:
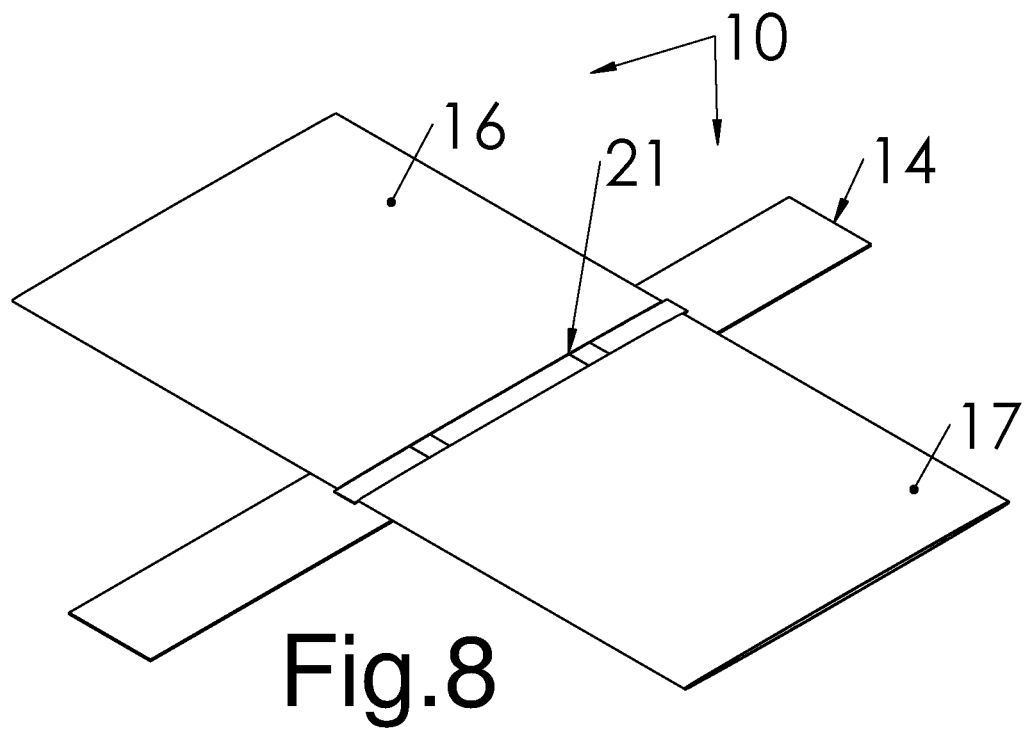
FIG. 8 shows the sealing band underneath the junction of the pipe ends overlying the pipe junction, prior to complete deployment.
Figure 9:
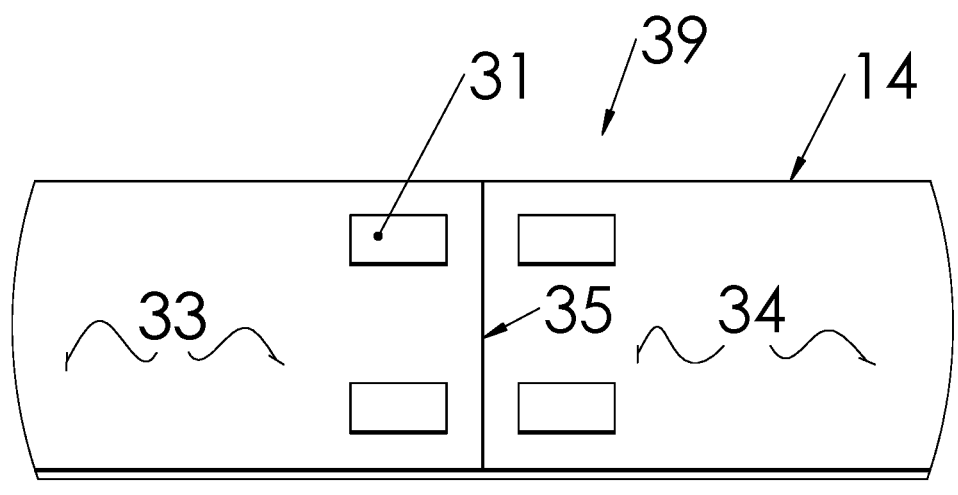
FIG. 9 is an enlarged, fragmentary plan view of the sealing band center prior to exposure of the main adhesive by removal of exterior tear strips.
Figure 10:
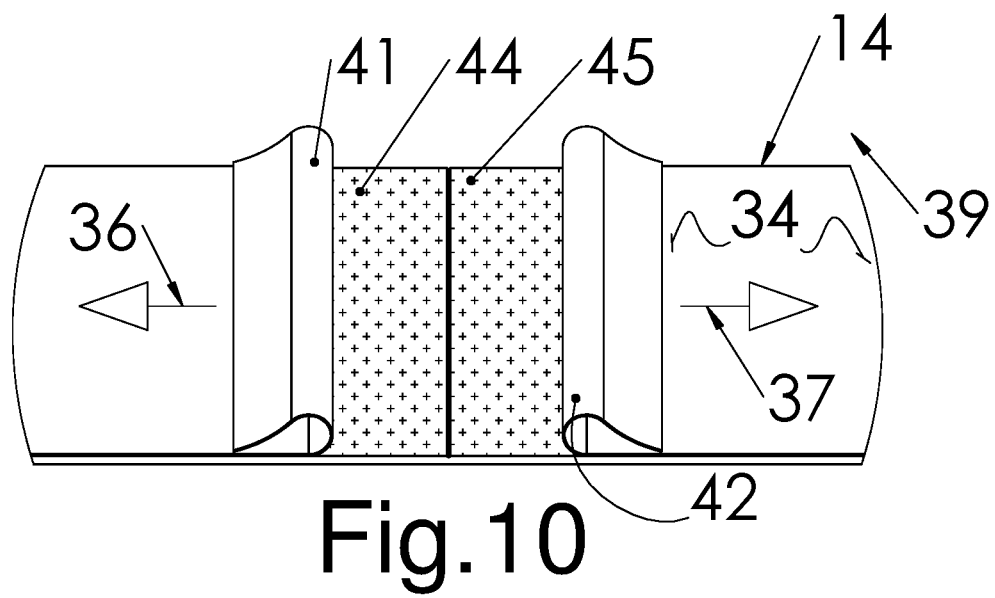
FIG. 10 shows both sealing band tear strips being manually removed to expose an adhesive portion that is adhesively coupled over and seals the pipe junction.
Figure 11:
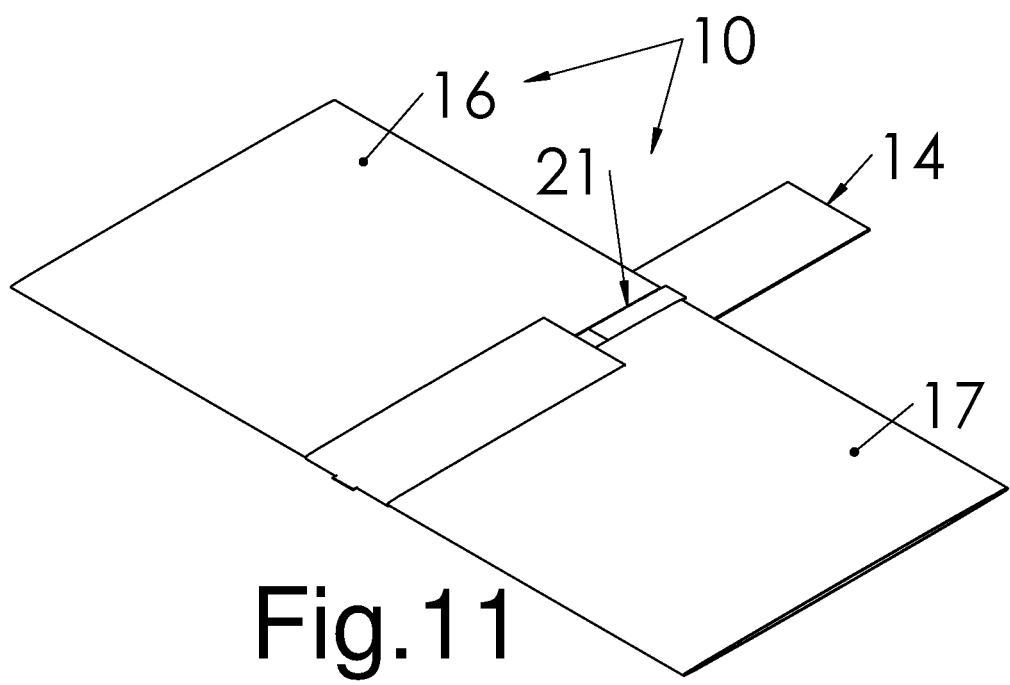
FIG. 11 is a fragmentary isometric view showing the sealing band partially adhesively coupled to adjacent flat pipe ends; and, FIG. 12 is a fragmentary isometric view showing the sealing band completely to adjacent pipe ends, wherein the tubular configuration of FIG. 2 results after the application of water pressure.
Figure 12:
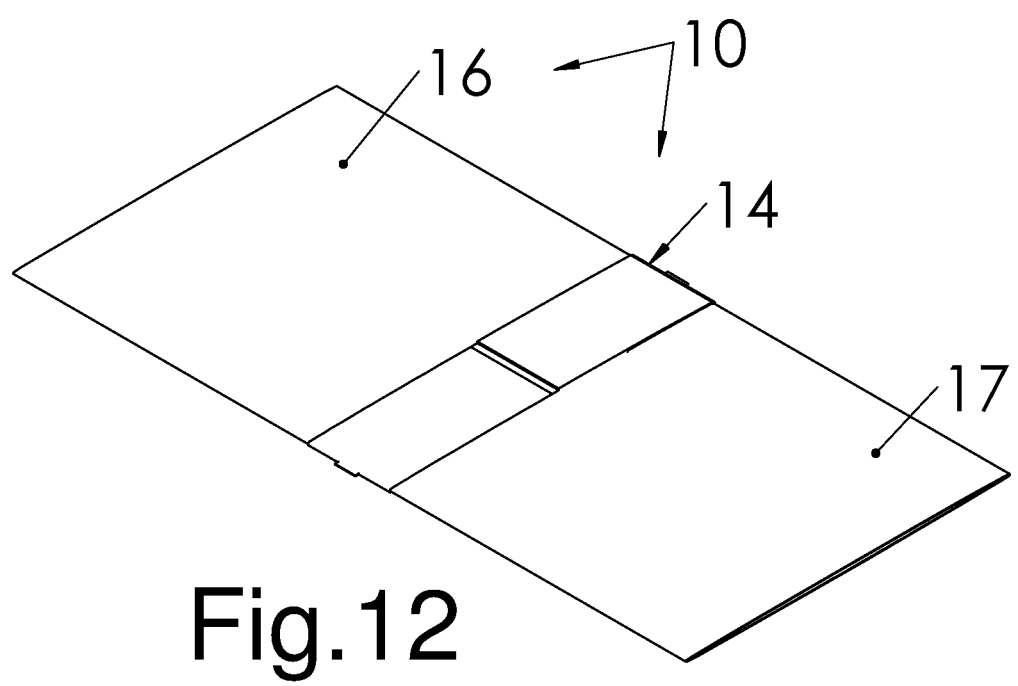

Referring to FIG. 8, the sealing band 14 can be positioned such that it is disposed beneath the pipe ends, generally aligned with the pipe junction 21 (FIG. 8). Junction 21 is aligned with the tabs 13. The elongated, flat and generally rectangular sealing band 14 has a plurality of adhesive sections 31 at its folding ends (FIG. 4) near middle 32. Referring to FIG. 9, the sealing band 14 is covered by elongated tear strips 33 and 34 that meet at junction 35. When the partially peeled away ends 41 and 42 of the tear strips are manually grasped and torn away, and moved as indicated by arrows 36 and 37, adhesive regions 44 and 45 are exposed (FIG. 10). By thereafter wrapping the sealing band 14 around the adjoining pipe ends at junction 21, as seen generally in FIG. 11, they can be pressed completely around the pipe ends to assume the configuration of FIG. 12. With the sealing band 14 thus encircling the pipe junction 21, it will adhesively attach to the poly-pipe with adhesive regions 44 and 45 pressed against outer pipe surfaces.

Thus the stabilizer 12 is adhesively affixed within the joined pipe ends, and the sealing band 14 is adhesively affixed around the exterior of the joined pipe ends. With water pressure thereafter applied to the poly-pipe, the pipe and the juncture will "inflate," whereby the repaired or coupled poly-pipe will assume the repaired configuration of FIGS. 2 and 3.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A flexible splicer for joining plastic pipe ends, the splicer comprising:

a flexible, non-rigid stabilizer adapted to receive both of the pipe ends to be joined, the stabilizer comprising a plurality of adhesive segments adapted to interiorly attach to pipe ends;

a flexible sealing band adapted to exteriorly circumscribe the joined pipe ends over the stabilizer, the sealing band comprising adhesive for externally attaching to the pipe ends and to said stabilizer;

whereby after the stabilizer and the sealing band are attached to the pipe ends, the poly-pipe may assume a generally cylindrical configuration in response to water pressure and;

wherein: the stabilizer is adapted to be transformed between a flat shipping configuration and a generally cylindrical configuration in response to water pressure when the poly-pipe ends are spliced together and the pipe is thereafter pressurized; and, the sealing band is adapted to be transformed between a flat shipping configuration and a generally cylindrical configuration in response to water pressure when the poly-pipe ends are spliced together and the pipe is thereafter pressurized.

2. The splicer as defined in claim 1 wherein the stabilizer comprises at least one tab for separating abutting pipe ends.

3. A flexible splicer for joining plastic poly-pipe ends, the splicer comprising:

a flat stabilizer adapted to receive flattened ends of poly-pipe to be joined, the stabilizer comprising a plurality of adhesive segments adapted to interiorly attach to pipe ends;

a flexible sealing band adapted to exteriorly be affixed to the joined pipe ends over the stabilizer, the sealing band comprising adhesive for externally attaching to the pipe ends and to said stabilizer;

whereby after the stabilizer and the sealing band are attached to the pipe ends, the poly-pipe may assume a generally cylindrical configuration in response to water pressure and;

wherein: the stabilizer is adapted to be transformed between a flat shipping configuration and a generally cylindrical configuration in response to water pressure when the poly-pipe ends are spliced together and the pipe is thereafter pressurized; and, the sealing band is adapted to be transformed between a flat shipping configuration and a generally cylindrical configuration in response to water pressure when the poly-pipe ends are spliced together and the pipe is thereafter pressurized.

4. The splicer as defined in claim 3 wherein the stabilizer comprises at least one tab for separating abutting pipe ends.

\* \* \* \* \*